US010282012B2

(12) United States Patent
Chen et al.

(10) Patent No.: US 10,282,012 B2
(45) Date of Patent: May 7, 2019

(54) TOUCH DISPLAY PANEL WITH FORCE SENSOR

(71) Applicant: AU OPTRONICS CORPORATION, Hsin-chu (TW)

(72) Inventors: Chi-Cheng Chen, Hsin-chu (TW); Gui-Wen Liu, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/808,224

(22) Filed: Nov. 9, 2017

(65) Prior Publication Data

US 2018/0136773 A1 May 17, 2018

(30) Foreign Application Priority Data

Nov. 11, 2016 (TW) .............................. 105136748 A

(51) Int. Cl.
| | |
|---|---|
| *G02F 1/1333* | (2006.01) |
| *G02F 1/1343* | (2006.01) |
| *G06F 3/041* | (2006.01) |
| *G06F 3/044* | (2006.01) |
| *G02F 1/1335* | (2006.01) |

(52) U.S. Cl.
CPC ...... *G06F 3/0414* (2013.01); *G02F 1/133345* (2013.01); *G02F 1/134309* (2013.01); *G06F 3/044* (2013.01); *G06F 3/0412* (2013.01); *G02F 1/13338* (2013.01); *G02F 1/133528* (2013.01)

(58) Field of Classification Search
CPC ......... G02F 1/133345; G02F 1/133528; G02F 1/134309; G02F 1/13338; G06F 3/0412; G06F 3/0414; G06F 3/044
See application file for complete search history.

(56) References Cited

U.S. PATENT DOCUMENTS

| | | | |
|---|---|---|---|
| 9,116,569 B2 | 8/2015 | Stacy et al. | |
| 2007/0229464 A1 | 10/2007 | Hotelling et al. | |
| 2008/0137020 A1* | 6/2008 | Takahashi | G02F 1/13452 349/150 |
| 2011/0096024 A1 | 4/2011 | Kwak | |

(Continued)

FOREIGN PATENT DOCUMENTS

CN 203733086 U 7/2014

*Primary Examiner* — Hong Zhou
(74) *Attorney, Agent, or Firm* — Tim Tingkang Xia, Esq.; Locke Lord LLP

(57) ABSTRACT

A touch display panel includes a first substrate, a second substrate, a display medium layer, a transparent electrode layer, a first conductive layer, a control unit and a ground electrode layer. The display medium layer is disposed between the first and second substrates. The transparent electrode layer is disposed on an inner surface of the first substrate and includes touch electrodes disposed in the display region. The first conductive layer is disposed at the transparent electrode layer and includes touch conductive lines and force sensing lines. Each touch conductive line is electrically connected to one touch electrode. The force sensing lines are electrically insulated from the touch conductive lines. A portion of the force sensing lines is connected to the control unit. The ground electrode layer is disposed on the second substrate. A force sensor is formed of the ground electrode layer, the force sensing lines and the control unit.

12 Claims, 15 Drawing Sheets

(56) References Cited

U.S. PATENT DOCUMENTS

| | | | |
|---|---|---|---|
| 2011/0304564 A1* | 12/2011 | Kim | G06F 3/044 |
| | | | 345/173 |
| 2015/0309634 A1* | 10/2015 | Lee | G06F 3/0412 |
| | | | 345/173 |
| 2016/0370944 A1 | 12/2016 | Zhao et al. | |
| 2017/0010745 A1* | 1/2017 | Liu | G06F 3/0412 |
| 2017/0108983 A1* | 4/2017 | Chen | G06F 3/0416 |
| 2017/0115768 A1* | 4/2017 | Shih | G06F 3/044 |
| 2018/0046278 A1* | 2/2018 | Weng | G02F 1/13338 |

* cited by examiner

TOUCH DISPLAY PANEL WITH FORCE SENSOR

CROSS-REFERENCE TO RELATED PATENT APPLICATION

This application claims priority to and the benefit of, pursuant to 35 U.S.C. § 119(a), patent application Serial No. 105136748 filed in Taiwan on Nov. 11, 2016. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to a touch display panel with a force sensor, and in particular, to a touch display panel that integrates a force sensor into the touch display panel.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Currently, technology development of touch panels is very diverse. Due to features such as high accuracy, multi-touch, high durability, and high touch resolution, capacitive touch panel has become a mainstream touch technology applied to current middle and high-end consumer electronic products. However, with a current touch panel, only a corresponding single instruction can be executed by means of a detected touch position, but another instruction cannot be further executed by means of a touch action. Therefore, currently, an additionally arranged force sensor is developed, so as to synchronously detect a force applied by touch, and execute a corresponding instruction according to the force. However, a conventional force sensor is disposed outside a touch display panel, and the stability of the adhesion between the force sensor and the touch display panel affects a yield or the reliability of products. Therefore, how to integrate a force sensor into a touch display panel is a current challenge.

SUMMARY

One of the objectives of the present invention is to provide a touch display panel with a force sensor, wherein the force sensor is integrated in the touch display panel, so as to reduce an entire thickness of the touch display panel.

To achieve the foregoing objective, the present invention provides a touch display panel with a force sensor, comprising: a first substrate, a second substrate, a display medium layer, a transparent electrode layer, a first conductive layer, a control unit, and a ground electrode layer. The first substrate and the second substrate are disposed opposite to each other, the first substrate has a display region and a peripheral, and the peripheral region surrounds the display region. The display medium layer is disposed between the first substrate and the second substrate. The transparent electrode layer is disposed on an inner surface of the first substrate. The transparent electrode layer comprises a plurality of touch electrodes disposed side by side in the display region. The inner surface of the first substrate is a surface facing the display medium layer. The first conductive layer is disposed on the inner surface of the first substrate and located at one side of the transparent electrode layer. The first conductive layer comprises a plurality of touch conductive lines and a plurality of force sensing lines. Each of the touch conductive lines is electrically connected to one of the touch electrodes. The force sensing lines are electrically insulated from the touch conductive lines. The control unit is disposed at the peripheral region, and a portion of the force sensing lines extends from the display region to the peripheral region and is connected to the control unit. The ground electrode layer is disposed on a surface of the second substrate. A force sensor is formed of the ground electrode layer, the force sensing lines, and the control unit.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
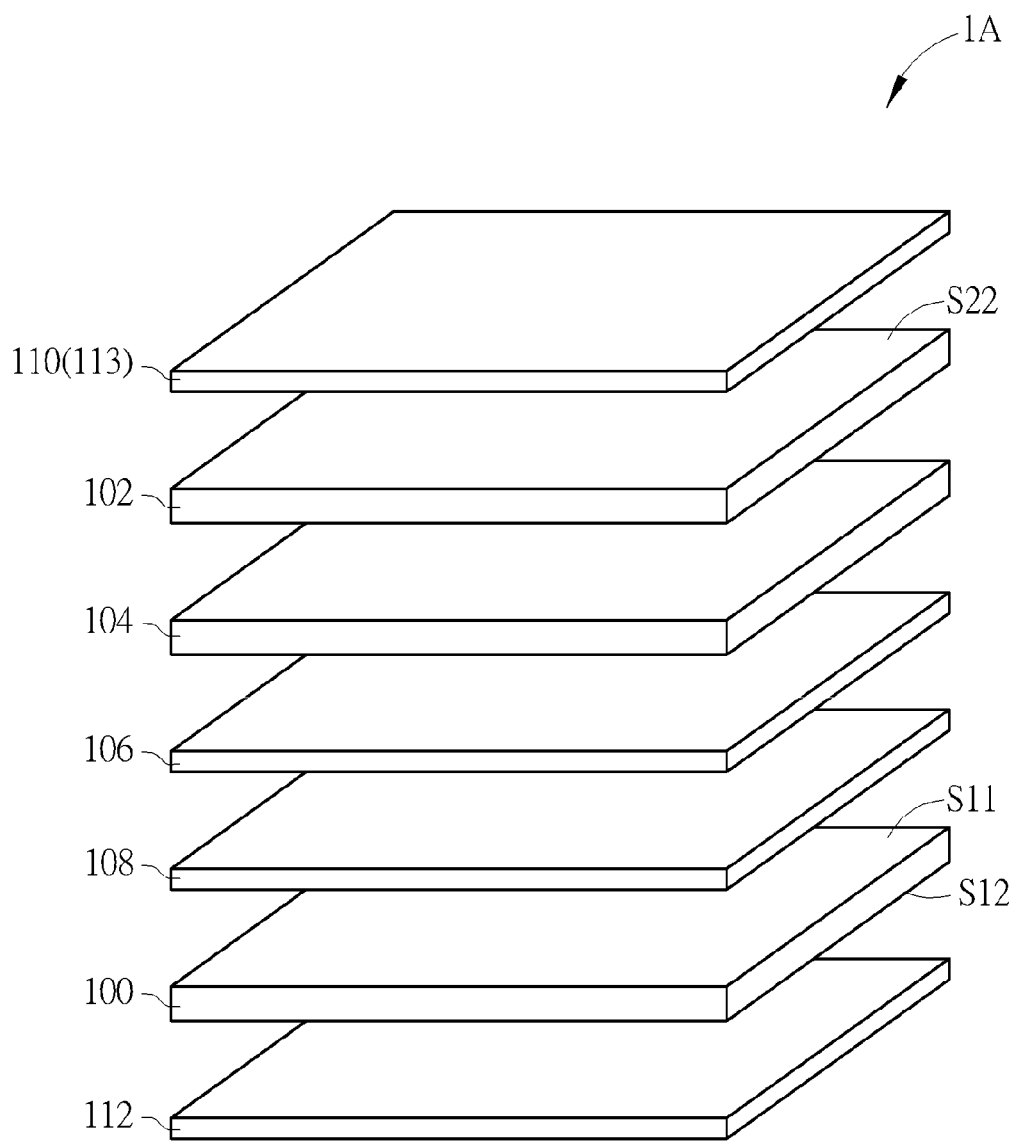
FIG. 1 is a schematic exploded view of a touch display panel with a force sensor according to a first embodiment of the present invention.

To make the present invention more comprehensible to a person of ordinary skill in the art, features and effects of the present invention are described in detail below through preferred embodiments of the present invention with reference to the accompanying drawings. Besides, to highlight features of the present invention, a touch display panel with a force sensor in the drawings is schematically illustrated, and specific scale thereof is not limited to the drawings.

Figure 2:
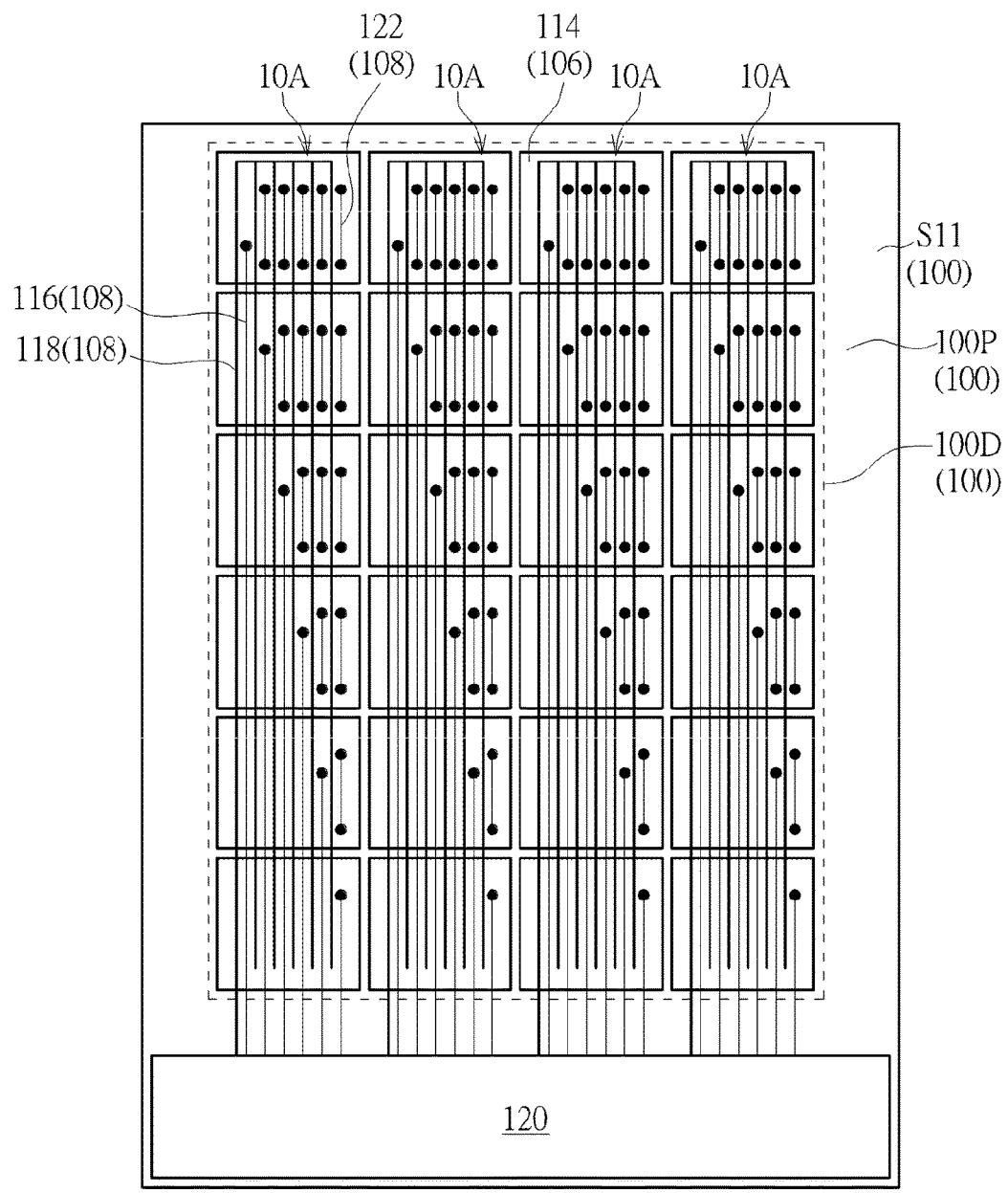
FIG. 2 is a schematic diagram of a first substrate according to the first embodiment of the present invention.
Figure 3A:
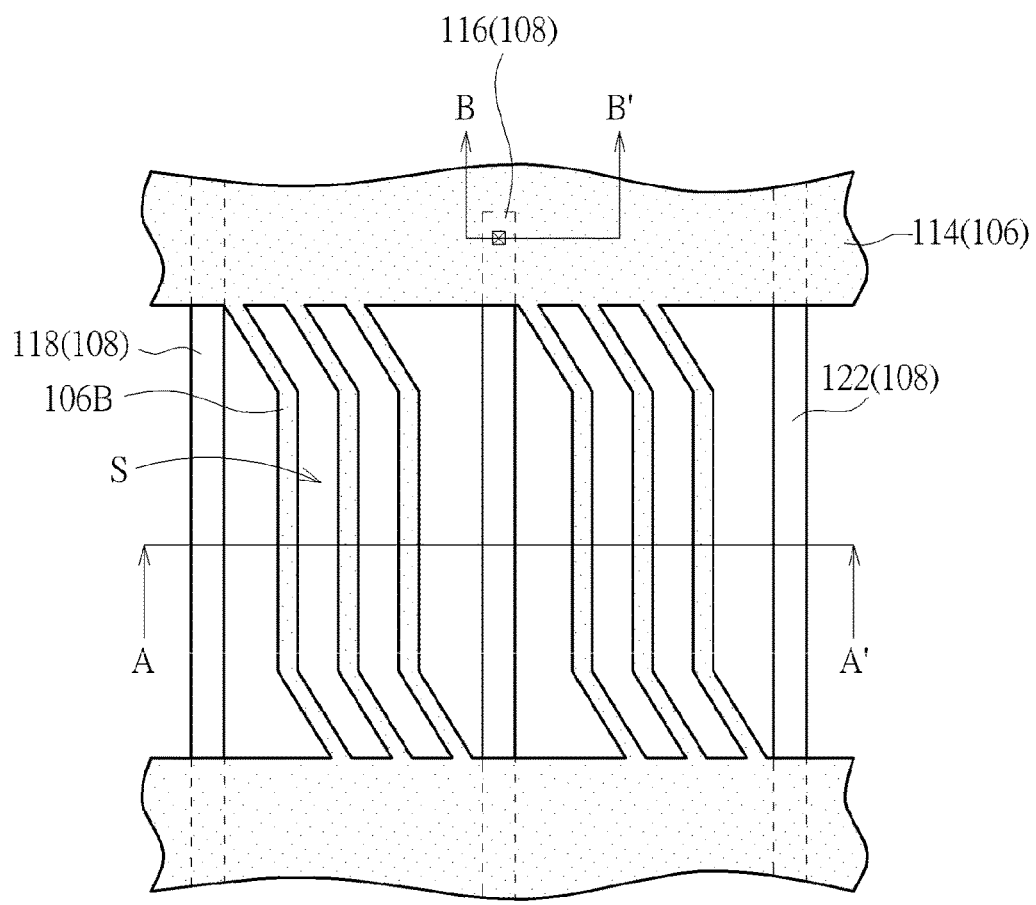
FIG. 3A is a partially enlarged schematic diagram a transparent electrode layer and a first conductive layer that are in a single pixel region according to FIG. 2.
Figure 3B:
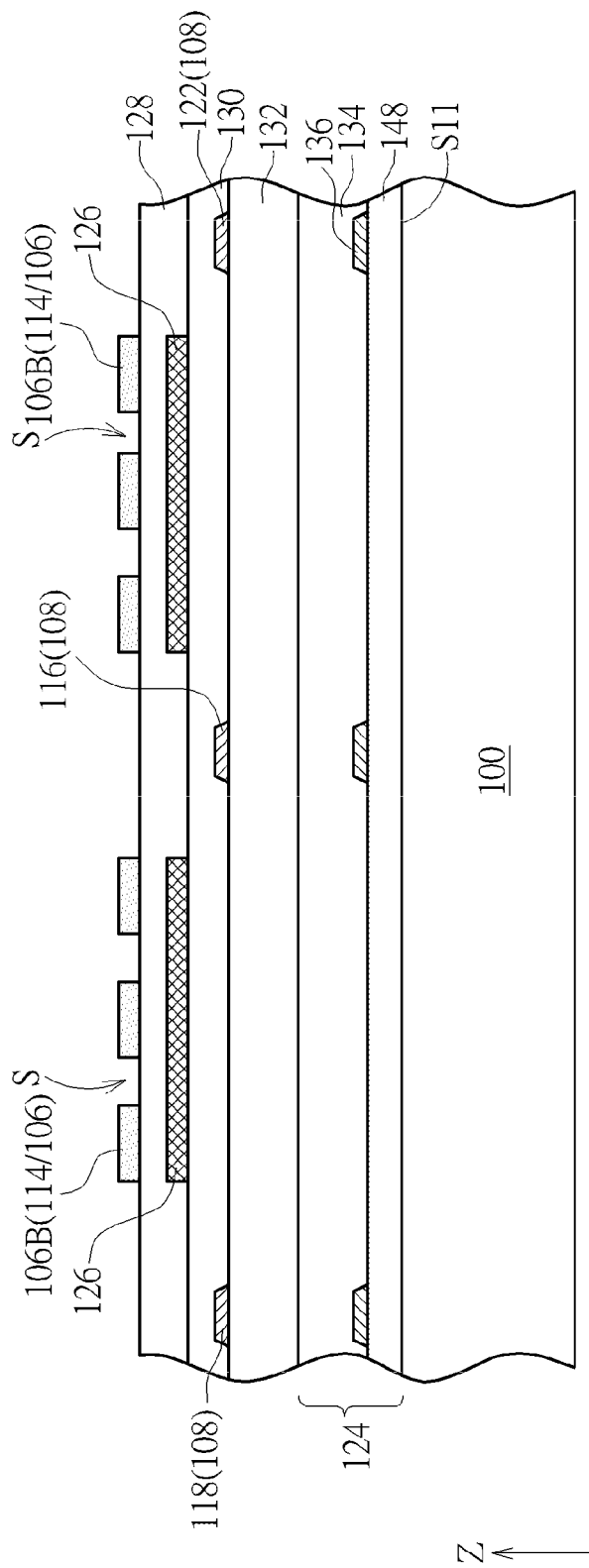
FIG. 3B is a schematic cross-sectional view of the first substrate taking along a line A-A' of FIG. 3A according to the first embodiment of the present invention.
Figure 3C:
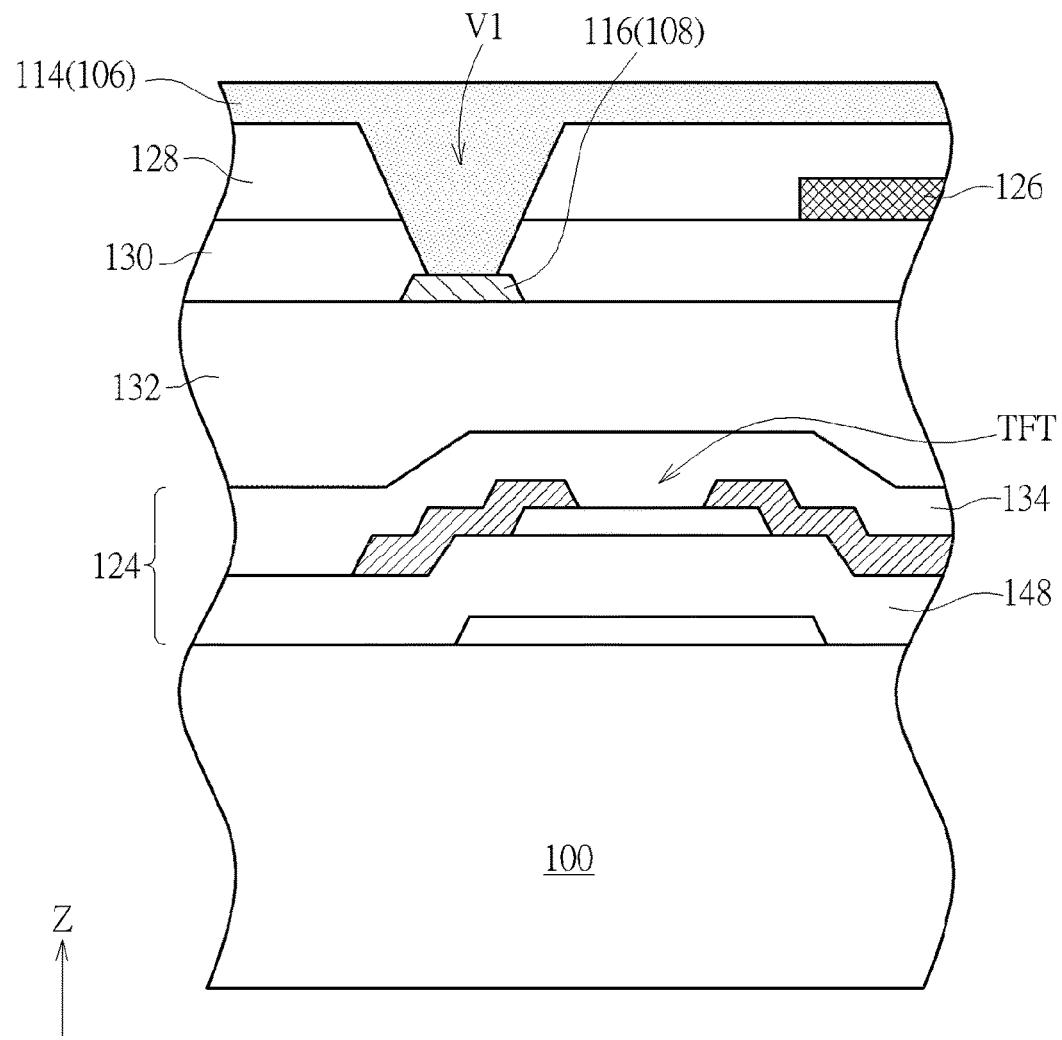
FIG. 3C is a schematic cross-sectional view of the first substrate taking along a line B-B' of FIG. 3A according to the first embodiment of the present invention.

Referring to FIG. 1 to FIG. 3C, FIG. 1 is a schematic exploded view of a touch display panel with a force sensor according to a first embodiment of the present invention, which mainly shows the structure related to the force sensor and a touch sensing device, FIG. 2 is a schematic diagram of a first substrate according to the first embodiment of the present invention, FIG. 3A is a partially enlarged schematic diagram of a transparent electrode layer and a first conductive layer that are in a single pixel region according to FIG. 2, FIG. 3B is a schematic cross-sectional view of the first substrate taking along a line A-A' of FIG. 3A according to the first embodiment of the present invention, and FIG. 3C is a schematic cross-sectional view of the first substrate taking along a line B-B' of FIG. 3A according to the first embodiment of the present invention. As shown in FIG. 1, a touch display panel 1A of this embodiment includes a first substrate 100, a second substrate 102, a display medium layer 104, a transparent electrode layer 106, a first conductive layer 108, a ground electrode layer 110, and polarizers 112, 113. The first substrate 100 and the second substrate 102 are oppositely disposed in parallel, and the display medium layer 104 is disposed between the first substrate 100 and the second substrate 102. The first substrate 100 and the second substrate 102 may include a transparent substrate such as a glass substrate or a plastic substrate, but the present invention is not limited thereto. In this embodiment, the display medium layer 104 is a liquid crystal layer, but the present invention is not limited thereto. Alternatively, the display medium layer 104 may be another display medium layer depending on different types of the touch display panel 1A, for example, an electrophoretic material layer, an electrowetting material layer, an electroluminescent material layer, or the like. The transparent electrode layer 106 is disposed on an inner surface S11 of the first substrate 100, where the inner surface S11 of the first substrate 100 refers to a surface facing the display medium layer 104. A material of the transparent electrode layer 106 may include indium tin oxide (ITO), indium zinc oxide (IZO), or another transparent conductive material with high light transmittance and good conductivity. The first conductive layer 108 is disposed on the inner surface S11 of the first substrate 100, and is located at one side of the transparent electrode layer 106. In this embodiment, the first conductive layer 108 is disposed between the first substrate 100 and the transparent electrode layer 106. A material of the first conductive layer 108 may include a metal, but the present invention is not limited thereto. The touch display panel 1A has two polarizers 112, 113. The polarizer 112 is located on a surface S12, opposite to the display medium layer 104, of the first substrate 100, and the polarizer 113 is located on a surface S22, opposite to the display medium layer 104, of the second substrate 102. The ground electrode layer 110 is disposed on the surface S22, opposite to the display medium layer 104, of the second substrate 102. In this embodiment, the ground electrode layer 110 is a portion of the polarizer 113, for example, one of the film layers of the polarizer 113, for example, an adhesive layer on the surface of the polarizer 113 facing the second substrate 102 is used as a conductive adhesive that functions as the ground electrode layer 110, but the present invention is not limited thereto. The ground electrode layer 110 may be a full-surface type film layer, may have an approximately fixed voltage level when the touch display panel 1A is operated, or the ground electrode layer 110 is grounded when the touch display panel 1A is operated. A conductive material of the ground electrode layer 110 may have impedance of $10^8$-$10^9 \Omega/\square$, but the present invention is not limited thereto.

As shown in FIG. 2, the inner surface S11 of the first substrate 100 has a display region 100D and a peripheral region 100P, and the peripheral region 100P surrounds the display region 100D. The transparent electrode layer 106 includes a plurality of touch electrodes 114 that are disposed side by side in the display region 100D, but the present invention is not limited thereto. In another variant embodiment, the touch electrodes 114 at an edge of the display region 100D may extend into a portion of the peripheral region 100P. The touch electrodes 114 are separated and electrically insulated from each other. In this embodiment, the touch electrodes 114 extend along a first direction D1 to form a plurality of straight columns 10A, the straight columns 10A are disposed side by side in parallel along a second direction D2, and the first direction D1 is not parallel with the second direction D2, but a configuration manner of the touch electrodes 114 is not limited thereto. The first conductive layer 108 includes a plurality of touch conductive lines 116 and a plurality of force sensing lines 118. Each of the touch conductive lines 116 is electrically connected to one of the touch electrodes 114, and each of the touch electrodes 114 may be electrically connected to a control unit 120 in the peripheral region 100P of the first substrate 100 by means of a touch conductive line 116. In this embodiment, the touch conductive lines 116 extend along the first direction D1 from the display region 100D to the peripheral region 100P and are connected to the control unit 120, but the present invention is not limited thereto. The force sensing lines 118 are distributed in the display region 100D and extend approximately along the first direction D1 in a parallel manner. In this embodiment, the force sensing lines 118 and the touch conductive lines 116 are disposed side by side in an alternate manner along the second direction D2, and the force sensing lines 118 are electrically insulated from the touch conductive lines 116. However, the present invention is not intended to specifically limit an arrangement manner, an arrangement sequence, or a relative relationship of the force sensing lines 118 and the touch conductive lines 116, in other words, in another embodiment, the force sensing lines 118 and the touch conductive lines 116 may be not disposed side by side in an alternate manner. In this embodiment, each straight column 10A of the touch electrodes 114 corresponds to a portion of the plurality of force sensing lines 118, the portion of the force sensing lines 118 corresponding to the same straight column 10A are electrically connected to each other, the portion of the force sensing lines 118 are disposed side by side along the second direction D2, so as to form a comb-like shape in the straight column 10A of the touch electrodes 114, but the present invention is not limited thereto, for example, spaces between the force sensing lines 118 may be not completely the same. Besides, in this embodiment, in the plurality of force sensing lines 118 corresponding to the same straight column 10A, only one force sensing line 118 extends from the display region 100D to the peripheral region 100P and is connected to the control unit 120, but the present invention is not limited thereto. A configuration manner of the touch conductive lines 116 and the force sensing lines 118 of the touch display panel 1A is not limited to the practice in this embodiment, and a different configuration manner may be adopted according to requirements. Reference is further made to FIG. 1 and FIG. 2 together. The ground electrode layer 110, the force sensing lines of the first conductive layer 108, and the control unit 120 form the force sensor of this embodiment. The ground electrode layer 110 has a fixed voltage level, and each of the force sensing lines 118 can provide a voltage through the control unit 120, so that a capacitance can be formed between the ground electrode layer 110 and the force sensing line 118. In this way, when a finger performs pressing, a change in distance between the ground electrode layer 110 and the force sensing line 118 can be determined by using a change in the capacitance, thereby further determining a force of the pressing.

Besides, in this embodiment, the first conductive layer 108 of the touch display panel 1A may further selectively include dummy electrodes 122, for example, the dummy electrodes 122 may be line segment shaped electrodes, the dummy electrodes 122 are uniformly arranged at corresponding regions provided by the touch electrodes 114, and the dummy electrodes 122 and the force sensing lines 118 may be disposed side by side in an alternate manner along the second direction D2, but the present invention is not limited thereto. Besides, two ends of a line segment of each dummy electrode 122 are electrically connected to the corresponding touch electrode 114, but the present invention is not limited thereto. A configuration manner of the dummy electrodes 122 is not limited to the practice of this embodiment, and a different configuration manner may be adopted according to requirements.

As shown in FIG. 3A to FIG. 3C, the touch display panel 1A further includes a switch layer 124, a pixel electrode layer 126, a first insulating layer 128, a second insulating layer 130, and a planarization layer 132. The switch layer 124 is disposed on the inner surface S11 of the first substrate 100 and is disposed between the first substrate 100 and the first conductive layer 108. The switch layer 124 may include conductive lines such as data lines 136 and scan lines (not shown), and various electronic elements such as a thin film transistor (TFT) (only shown in FIG. 3C) and a capacitor (not shown). The foregoing conductive lines and the electronic elements are disposed between a third insulating layer 134 and a fourth insulating layer 148 or between other insulating layers that are not shown. In this embodiment, each of the data lines 136 overlaps a touch conductive line 116, a force sensing line 118, or a dummy electrode 122 in a direction Z vertical to the inner surface S11 of the first substrate 100, but the present invention is not limited thereto. In this embodiment, the transparent electrode layer 106 functions as a common electrode of the touch display panel 1A, and also functions as the touch electrodes 114. A pixel electrode layer 126 is disposed between the switch layer 124 and the transparent electrode layer 106 and is located in the display region 100D, and the pixel electrode layer 126 and the transparent electrode layer 106 at least partially overlap in the direction Z vertical to the inner surface S11 of the first substrate 100. Besides, in this embodiment, the touch electrodes 114 formed by the transparent electrode layer 106 include a plurality of branch electrodes 106B, and a slit S is provided between two branch electrodes 106B. A material of the pixel electrode layer 126 is a transparent conductive material such as ITO, but the present invention is not limited thereto. The first insulating layer 128 is disposed between the pixel electrode layer 126 and the transparent electrode layer 106, the second insulating layer 130 is disposed between the pixel electrode layer 126 and the first conductive layer 108, and the pixel electrode layer 126 is disposed between the transparent electrode layer 106 and the first conductive layer 108. As shown in FIG. 3C, the first insulating layer 128 has a via hole V1, which may be disposed at a position corresponding to a pattern of a black matrix layer (not shown), for example. The via hole V1 further penetrates through the second insulating layer 130 and exposes a portion of a top surface of a touch conductive line 116, and the transparent electrode layer 106 can fill the via hole V1 and be in contact with the portion of the top surface of the touch conductive line 116, so that the touch conductive line 116 is electrically connected to the corresponding touch electrode 114 through the via hole V1. In a variant embodiment, the via hole V1 may be filled with another conductive film layer, so that the transparent electrode layer 106 and the touch conductive lines 116 at an upper side and a lower side of the second insulating layer 130 are electrically connected. The planarization layer 132 is disposed between the switch layer 124 and the first conductive layer 108. The first insulating layer 128, the second insulating layer 130, the third insulating layer 134, and the fourth insulating layer 148 may include an inorganic insulating material, but the present invention is not limited thereto. The planarization layer 132 may include an organic insulating material, but the present invention is not limited thereto.

According to this embodiment, the force sensing lines 118 and the touch conductive lines 116 are formed by a same first conductive layer 108, and therefore can be synchronously manufactured without an additional photo mask. Besides, the ground electrode layer 110 is manufactured on the surface of the polarizer 113, and the polarizer 113 is also a common element in a common display panel. Therefore, in this embodiment, the force sensor is integrated into the touch display panel 1A, thereby improving a yield and the reliability of products as well as providing relatively small volume and weight.

The touch display panel in the present invention is not limited to the foregoing embodiment. Touch display panels of other preferred embodiments and variant embodiments of the present invention are sequentially introduced below. In addition, to facilitate the comparison of differences between the embodiments and the variant embodiments and simplify the description, like elements are denoted with a same reference sign in the following embodiments, the description is mainly made to the differences between the embodiments, and details of the repeated parts are not described herein again.

Figure 4A:
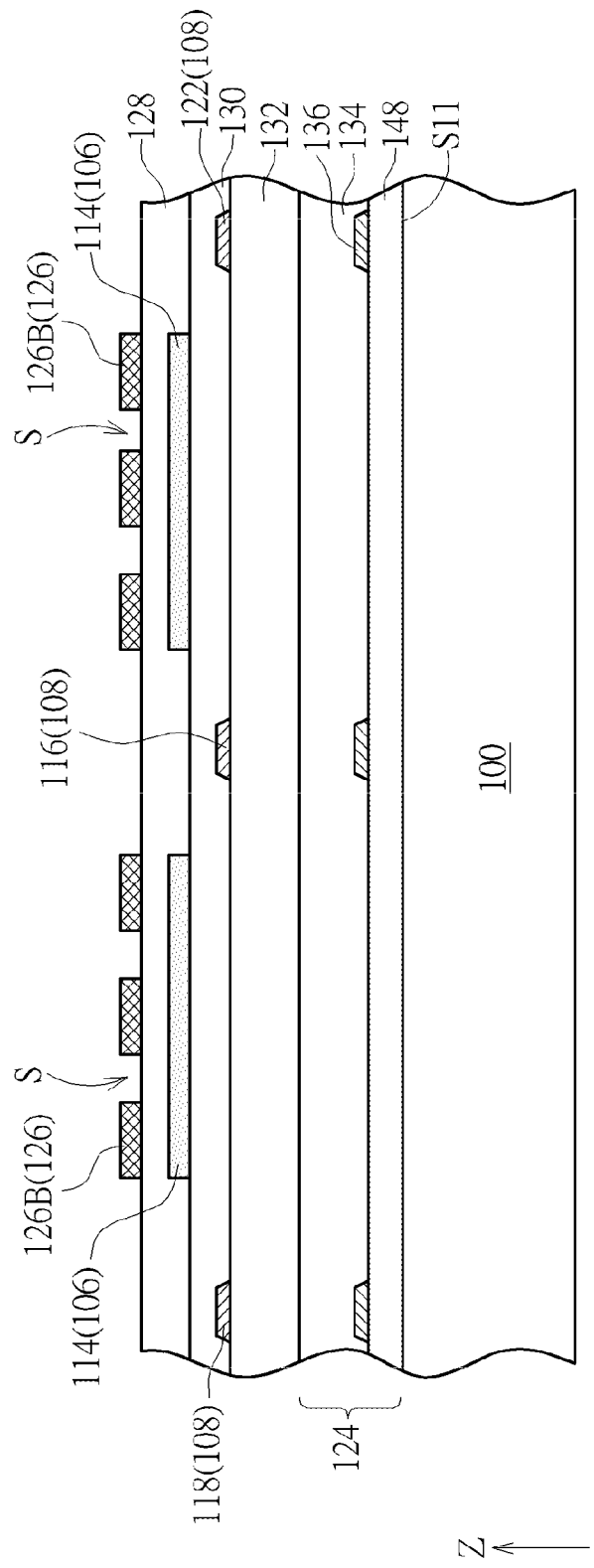
FIG. 4A is a schematic cross-sectional view of a first variant embodiment of the first embodiment of the present invention.
Figure 4B:
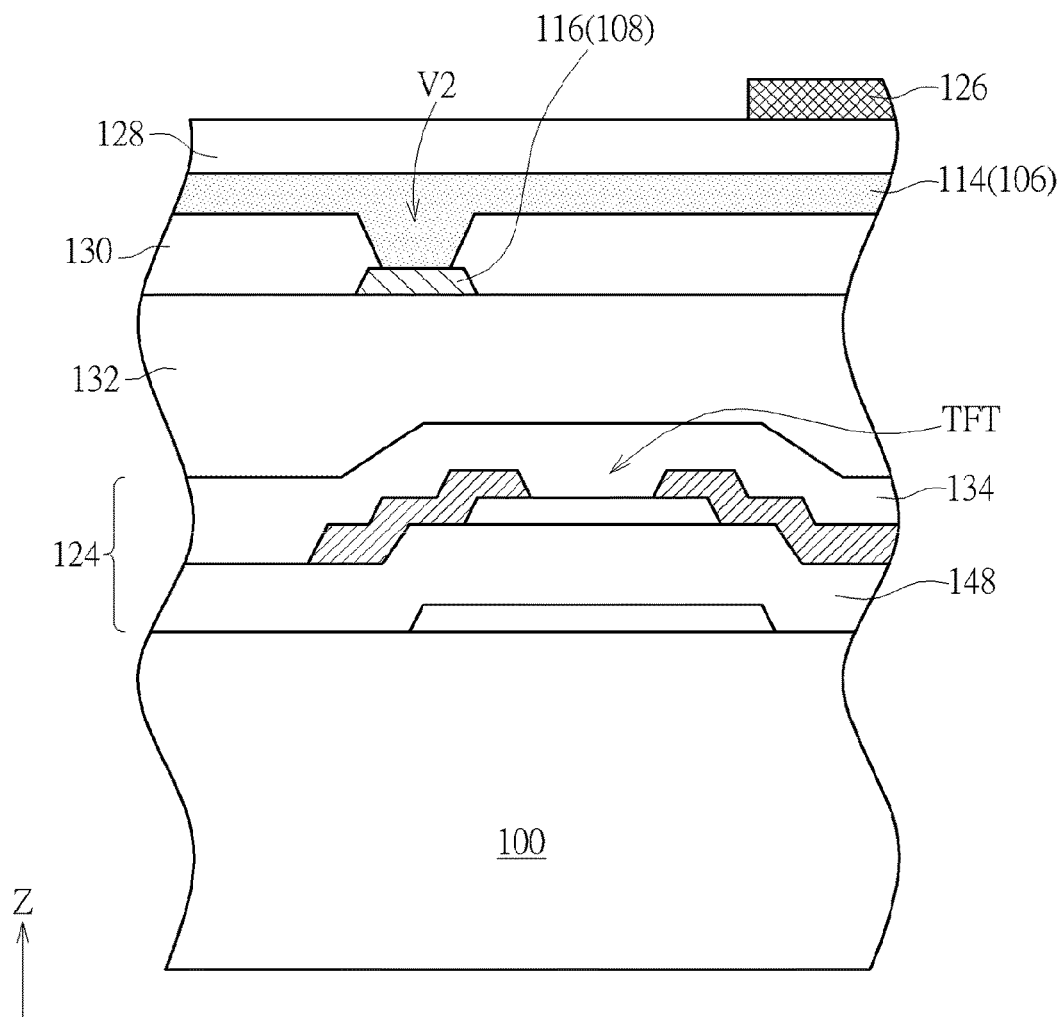
FIG. 4B is another schematic cross-sectional view of the first variant embodiment of the first embodiment of the present invention.

Referring to FIG. 4A and FIG. 4B, FIG. 4A and FIG. 4B are schematic cross-sectional views of a first variant embodiment of the first embodiment of the present invention. As shown in FIG. 4A, this variant embodiment differs from the first embodiment in that the transparent electrode layer 106 is disposed between the pixel electrode layer 126 and the first conductive layer 108, and the second insulating layer 130 is disposed between the transparent electrode layer 106 and the first conductive layer 108. The pixel electrode layer 126 has a plurality of branch electrodes 126B, and a slit S is provided between two branch electrodes 126B. No slit is provided in the touch electrodes 114 formed by the transparent electrode layer 106. As shown in FIG. 4B, the first insulating layer 128 does not have a via hole, but the second insulating layer 130 has a via hole V2, which exposes a portion of a top surface of a touch conductive line 116, and the transparent electrode layer 106 can fill the via hole V2 and be in contact with the portion of the top surface of the touch conductive line 116, so that the touch conductive line 116 is electrically connected to the corresponding touch electrode 114 through the via hole V2. In a variant embodiment, the via hole V2 may be filled with another conductive film layer, so that the transparent electrode layer 106 and the touch conductive lines 116 respectively located at an upper side and a lower side of the second insulating layer 130 are electrically connected. Other features of this variant embodiment are approximately similar to those of the first embodiment, reference may be made to FIG. 1 and FIG. 2, and details are not described herein again. Besides, the features of this variant embodiment may be applied to a second embodiment to a fourth embodiment below.

Figure 5:
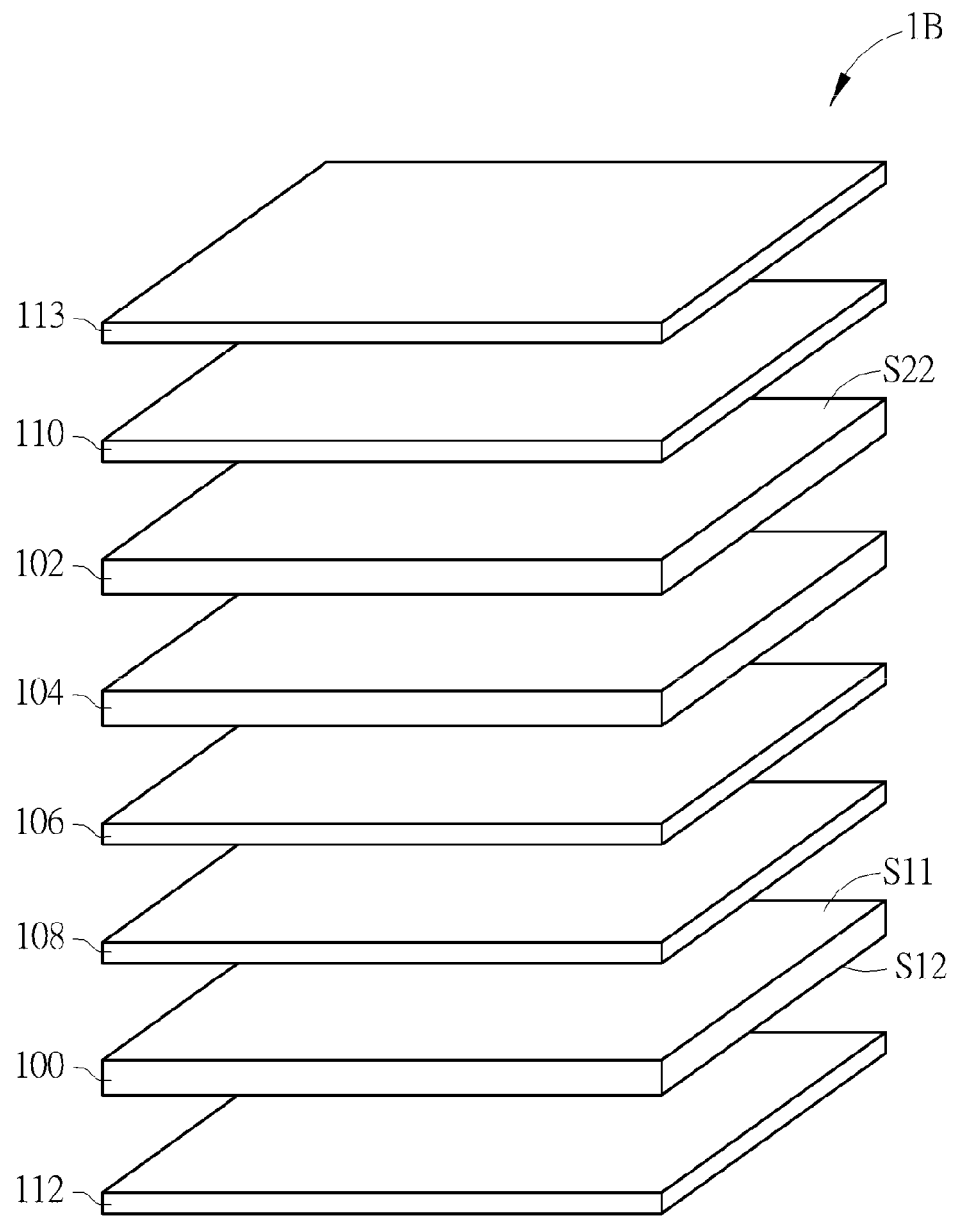
FIG. 5 is a schematic exploded view of a second variant embodiment of the first embodiment of the present invention.

Referring to FIG. 5, FIG. 5 is a schematic exploded view of a second variant embodiment of the first embodiment of the present invention, and FIG. 5 mainly shows film layers related to the force sensor and the touch sensing device. As shown in FIG. 5, this variant embodiment differs from the first embodiment in that the polarizer 113 is located on the surface S22, opposite to the display medium layer 104, of the second substrate 102 of a touch display panel 1B, and instead of being a portion of the polarizer 113, the ground electrode layer 110 is disposed between the polarizer 113 and the second substrate 102. The ground electrode layer 110 may include a transparent conductive material or another appropriate conductive material. Other features of this embodiment may be approximately similar to those of the foregoing embodiments, and details are not described herein again. Besides, the features of this variant embodiment may be applied to the second embodiment to the fourth embodiment below.

Figure 6:
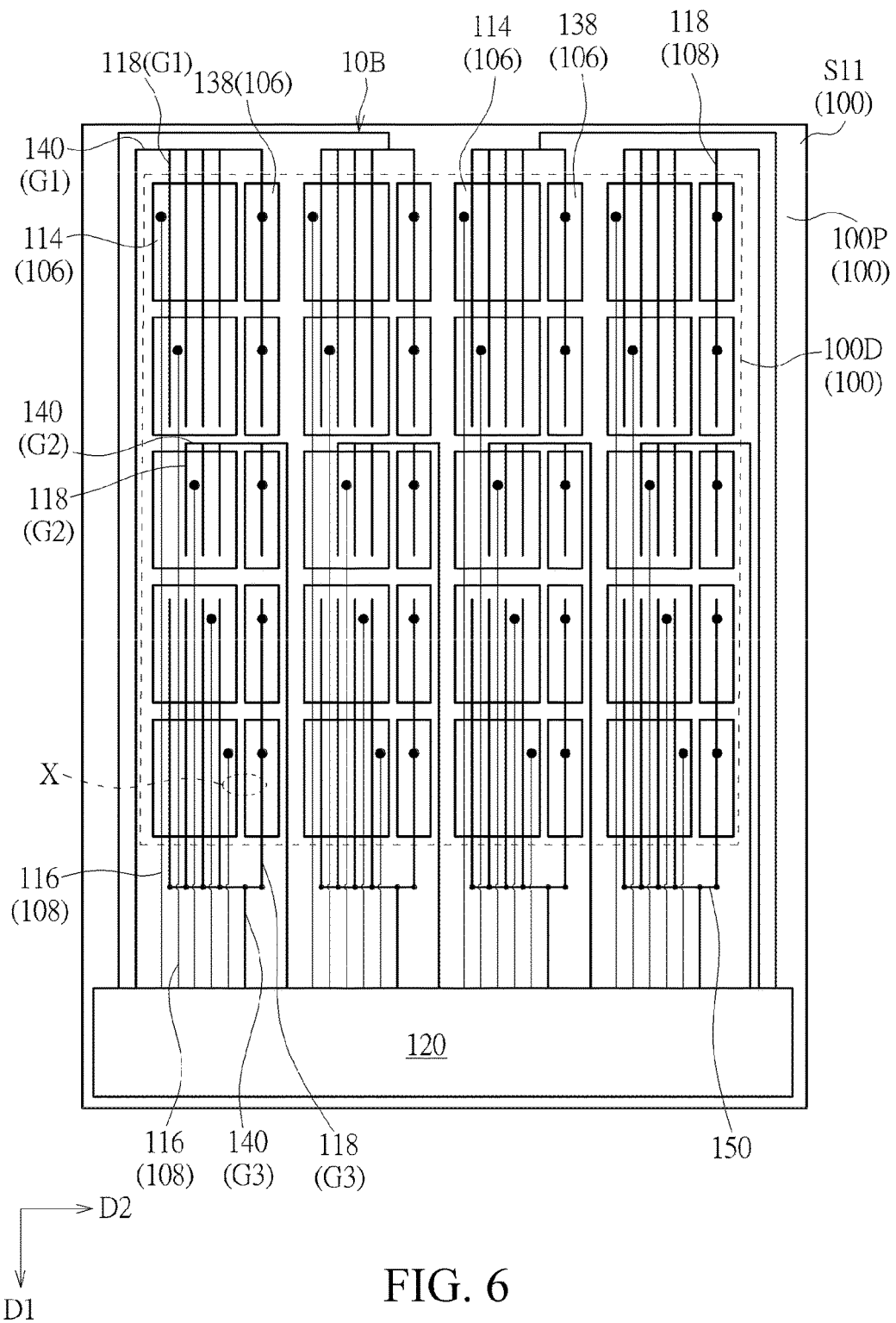
FIG. 6 is a schematic diagram of a first substrate according to a second embodiment of the present invention.
Figure 7:
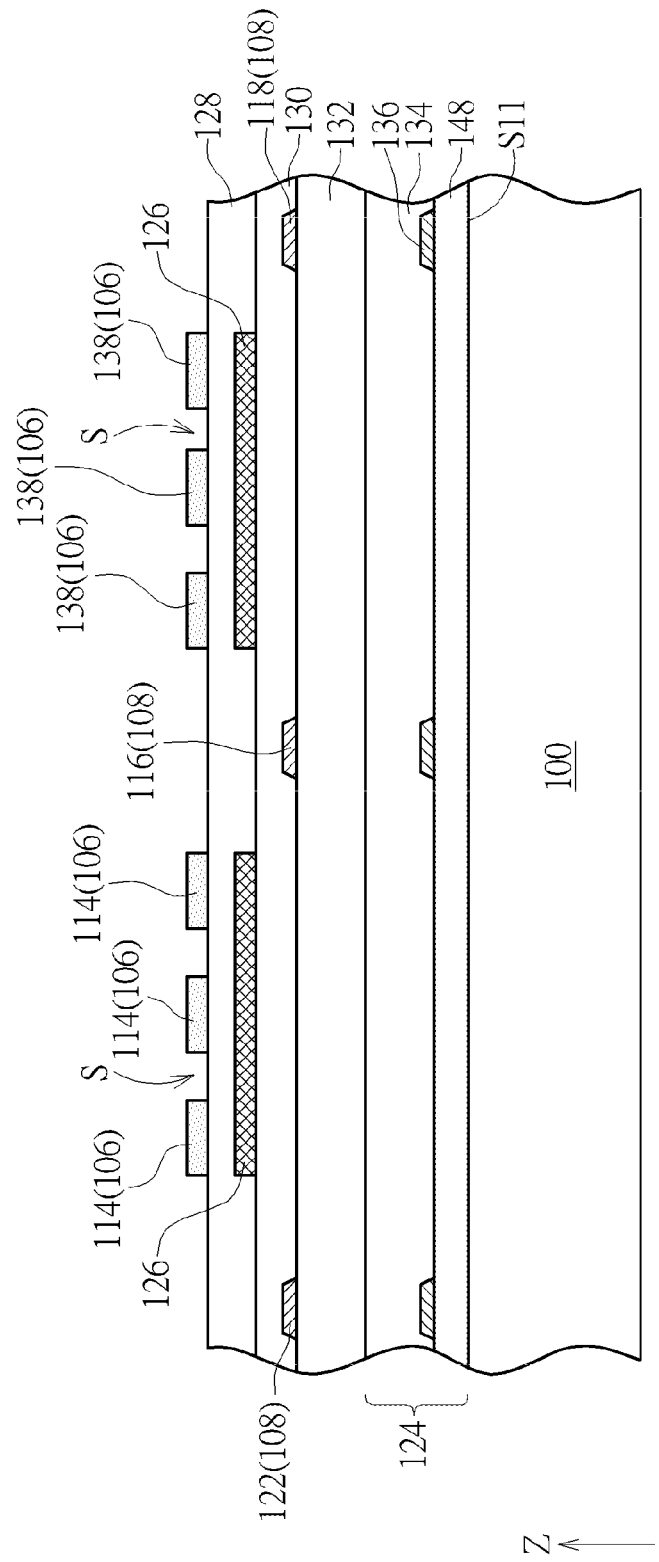
FIG. 7 is an enlarged schematic cross-sectional view of a region X of FIG. 6 of the first substrate according to the second embodiment of the present invention.

Referring to FIG. 6 and FIG. 7, FIG. 6 is a schematic diagram of a first substrate according to a second embodiment of the present invention, and FIG. 7 is an enlarged schematic cross-sectional view of a region X of FIG. 6 of the first substrate according to the second embodiment of the present invention. To clearly present features of this embodiment, the dummy electrodes are not shown in FIG. 6. As shown in FIG. 6 and FIG. 7, this embodiment differs from the first embodiment in that the transparent electrode layer 106 further includes a plurality of strip-shaped force sensing electrodes 138 that extend and are disposed along the first direction D1, each of the force sensing electrodes 138 is electrically connected to at least one of the force sensing lines 118, for example, a force sensing electrode 138 is electrically connected to a force sensing line 118 through the via holes in the first insulating layer 128 and the second insulating layer 130. In this embodiment, one force sensing electrode 138 is correspondingly disposed at a right side of one touch electrode 114, and each touch electrode 114 and each force sensing electrode 138 respectively have a plurality of branch electrodes (only shown in FIG. 7), but the present invention is not limited thereto. Although the force sensing electrodes 138 and the touch electrodes 114 are formed by the same transparent electrode layer 106, the force sensing electrodes 138 are electrically insulated from the touch electrodes 114. A configuration manner of the force sensing electrodes 138 and the touch electrodes 114 is not limited to this embodiment, and a different configuration manner may be adopted according to requirements. As shown in FIG. 7, the first conductive layer 108 of this embodiment may selectively have the dummy electrodes 122, and reference may be made to the practice of the first embodiment. Besides, in a variant embodiment of this embodiment, the transparent electrode layer 106 may be selectively disposed between the pixel electrode layer 126 and the first conductive layer 108, and reference may be made to the first variant embodiment of the first embodiment, FIG. 4A, and FIG. 4B for the practice.

In this embodiment, the force sensing lines 118 are divided into a plurality of sensing groups. Using one straight column 10B of the sensing electrodes 114 in FIG. 6 as an example, a first sensing group G1, a second sensing group G2, and a third sensing group G3 are sequentially disposed along a direction from the display region 100D to the control unit 120, each sensing group includes one or more force sensing lines 118 extending along the first direction D1 and one connection conductive line 140, and each connection conductive line 140 is electrically connected to the force sensing lines 118 in a same sensing group. In this embodiment, the connection conductive line 140 of the first sensing group G1 extends from the peripheral region 100, at a side opposite to the control unit 120, of the display region 100D to the peripheral region 100P at a side of the control unit 120, the connection conductive line 140 of the second sensing group G2 extends from the display region 100D to the peripheral region 100P, and the connection conductive line 140 of the third sensing group G3 is disposed at the peripheral region 100P near the control unit 120. The connection conductive lines 140 are electrically connected to the control unit 120, thereby enabling the force sensing lines 118 in the sensing groups to be electrically connected to the control unit 120. Further, although the force sensing lines 118 of each sensing group are electrically connected to each other, the force sensing lines 118 of different sensing groups are not electrically connected to each other. In this embodiment, the force sensing lines 118 and the connection conductive line 140 of each sensing group form a comb-like structure, the third sensing group G3 is disposed in a manner of being reverse to the first sensing group G1 and the second sensing group G2, each of the force sensing lines 118 in the first sensing group G1 and the third sensing group G3 crosses two touch electrodes 114, and the force sensing lines 118 of the sensing group G2 are merely disposed in one touch electrode 114, but the present invention is not limited thereto. Besides, the connection conductive line 140 of the third sensing group G3 is disposed between the display region 100D and the control unit 120. To avoid unnecessary electrical connection caused by crossing and contact between the connection conductive line 140 and the touch conductive lines 116, a portion of the connection conductive line 140 or the connection conductive line 140 of the third sensing group G3 is formed by a conductive layer (which is represented by the second conductive layer 150 in FIG. 6) other than the first conductive layer 108, for example, the connection conductive line 140 may be formed by a conductive layer of the data lines 136 or scan lines (not shown) in the switch layer 124, and the connection conductive line 140 of the third sensing group G3 may be electrically connected to the force sensing lines 118 through, for example, via holes (not shown). The sensing group formed by the connection conductive line 140 and the force sensing lines 118 is not limited to the practice of this embodiment, and a different configuration manner may be adopted according to actual requirements. For example, in this embodiment, the connection conductive line 140 do not overlay with touch electrodes 114, however, in a varied embodiment, the connection conductive line 140 maybe overlay with touch electrodes 114. In this embodiment, some of the force sensing lines 118 do not overlay with touch electrodes 114, however, in a varied embodiment, the force sensing lines 118 maybe overlay with touch electrodes 114. Other features of this embodiment may be approximately similar to those of the first embodiment, and details are not described herein again.

Figure 8:
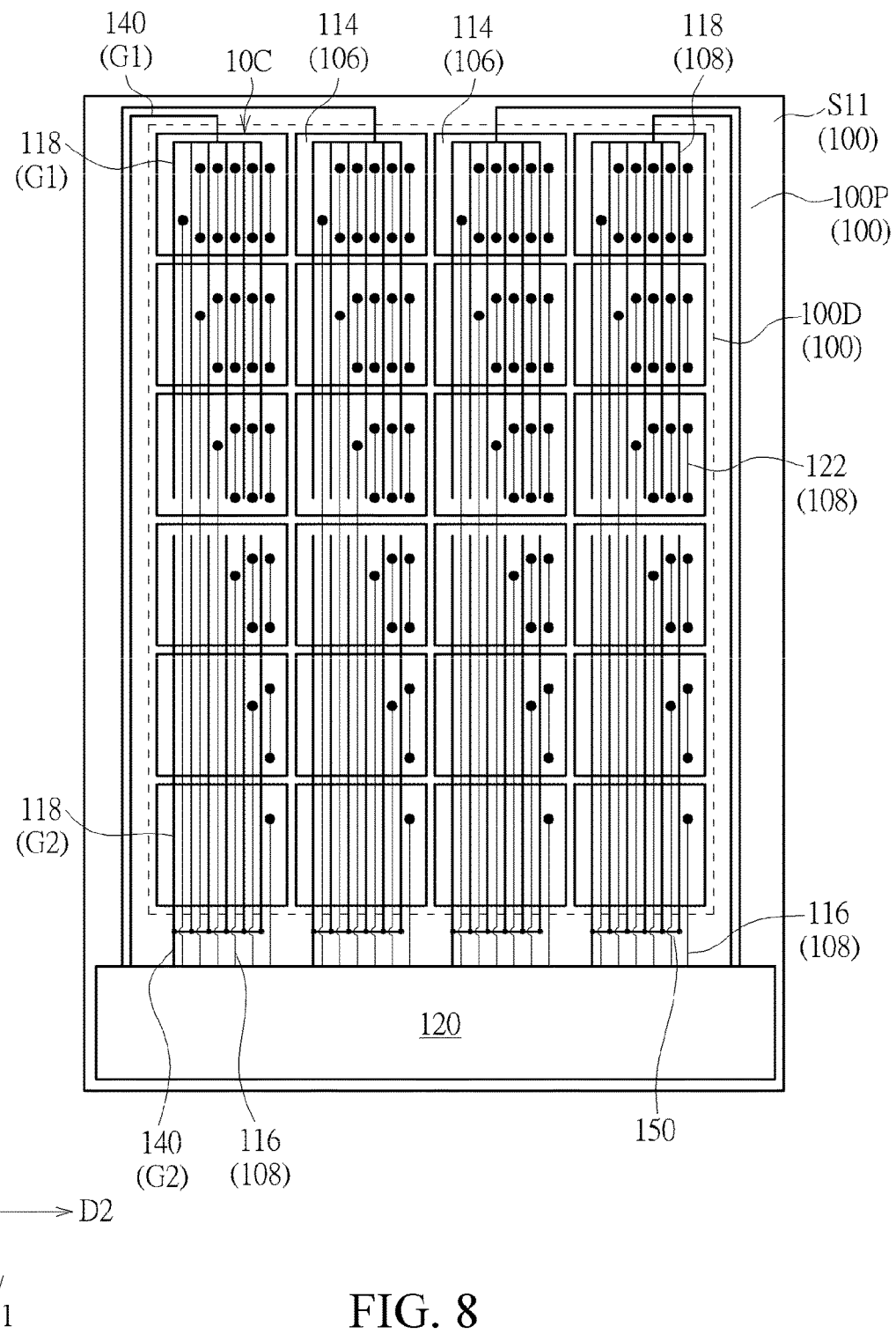
FIG. 8 is a schematic diagram of a first substrate according to a third embodiment of the present invention.

Referring to FIG. 8, FIG. 8 is a schematic diagram of a first substrate according to a third embodiment of the present invention. As shown in FIG. 8, this embodiment differs from the first embodiment in that the force sensing lines 118 are divided into a plurality of sensing groups. Using one straight column 10C of the sensing electrodes 114 in FIG. 8 as an example, the first sensing group G1 and the second sensing group G2 are sequentially disposed in a direction from the display region 100D to the control unit 120. Each sensing group includes one or more force sensing lines 118 extending along the first direction D1 and one connection conductive line 140, and the force sensing lines 118 of a same sensing group are electrically connected by means of the connection conductive line 140. In this embodiment, the force sensing lines 118 and the connection conductive line 140 of each sensing group form a comb-like structure, and each of the force sensing lines 118 of the first sensing group G1 and the second sensing group G2 crosses three touch electrodes 114, but the present invention is not limited thereto. Besides, in this embodiment, the connection conductive line 140 of the second sensing group G2 is disposed between the display region 100D and the control unit 120. To avoid unnecessary electrical connection caused by crossing and contact between the connection conductive line 140 and the touch conductive lines 116, the connection conductive line 140 of the second sensing group G2 is formed by a conductive layer other than the first conductive layer 108, and the connection conductive line 140 is electrically connected to the force sensing lines 118 through, for example, via holes (not shown). The sensing group formed by the connection conductive line 140 and the force sensing lines 118 is not limited to the practice of this embodiment, and a different configuration manner may be adopted according to actual requirements. Other features of this embodiment may be approximately similar to those of the first embodiment, reference may be made to the second embodiment for relative arrangement of and a connection relationship between the force sensing lines 118 and the connection conductive line 140, and details are not described herein again.

Figure 9:
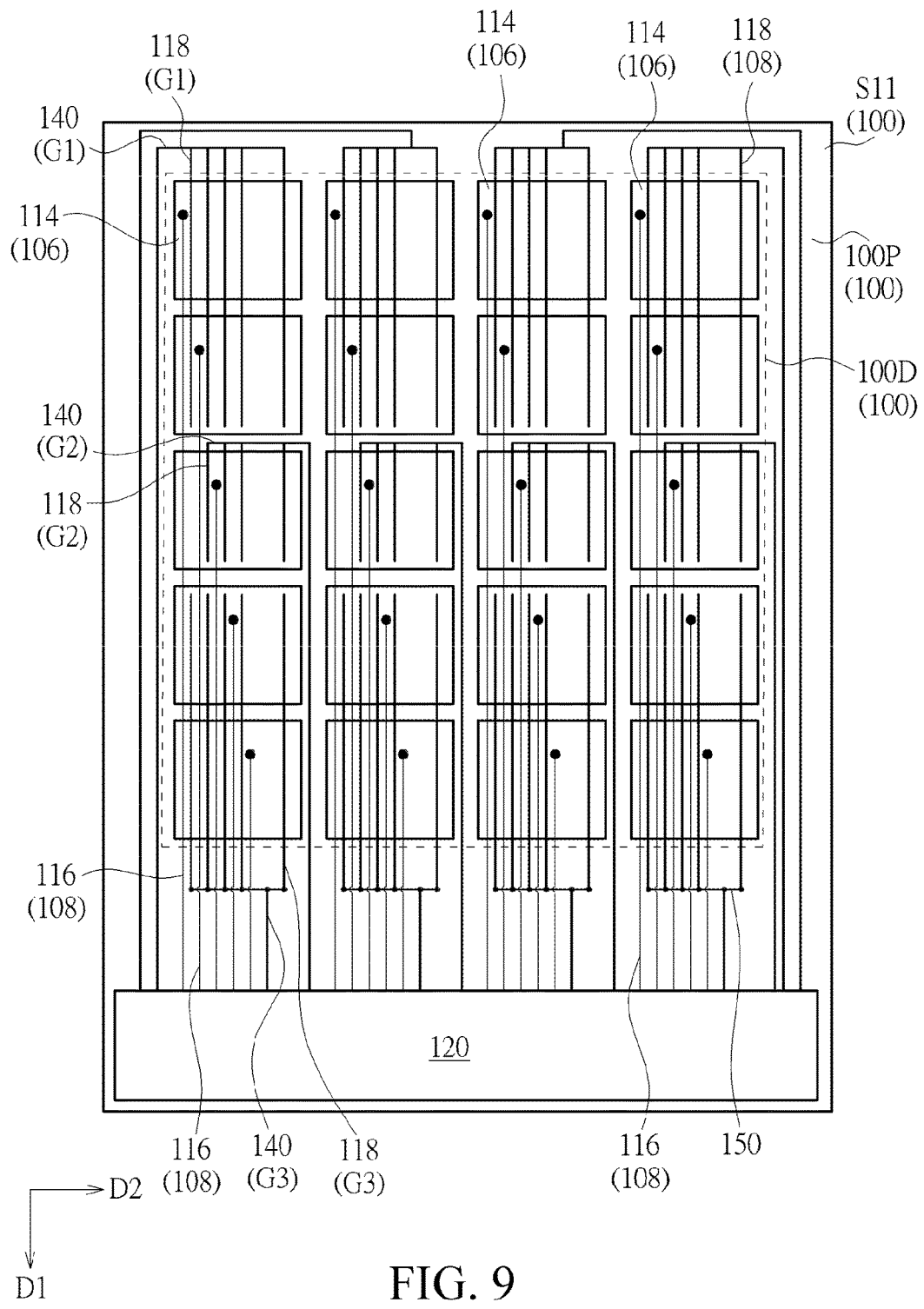
FIG. 9 is a schematic diagram of a first substrate according to a fourth embodiment of the present invention.

Referring to FIG. 9, FIG. 9 is a schematic diagram of a first substrate according to a fourth embodiment of the present invention. To clearly represent features of this embodiment, the dummy electrodes are not shown in FIG. 9. This embodiment differs from the second embodiment in that the transparent electrode layer 106 only includes the touch electrodes 114 in the display region 100D, and does not include the force sensing electrodes 138, the force sensing lines 118 of this embodiment are still divided into a plurality of sensing groups, a corresponding connection relationship between the force sensing lines 118 and the connection conductive line 140 of each sensing group is similar to that of the second embodiment, and details are not described herein again. The sensing group formed by the connection conductive line 140 and the force sensing lines 118 is not limited to the practice of this embodiment, and a different configuration manner may be adopted according to actual requirements. Besides, the first conductive layer 108 of this embodiment may selectively have the dummy electrodes 122, and reference may be made to the practice of the first embodiment.

Figure 10:
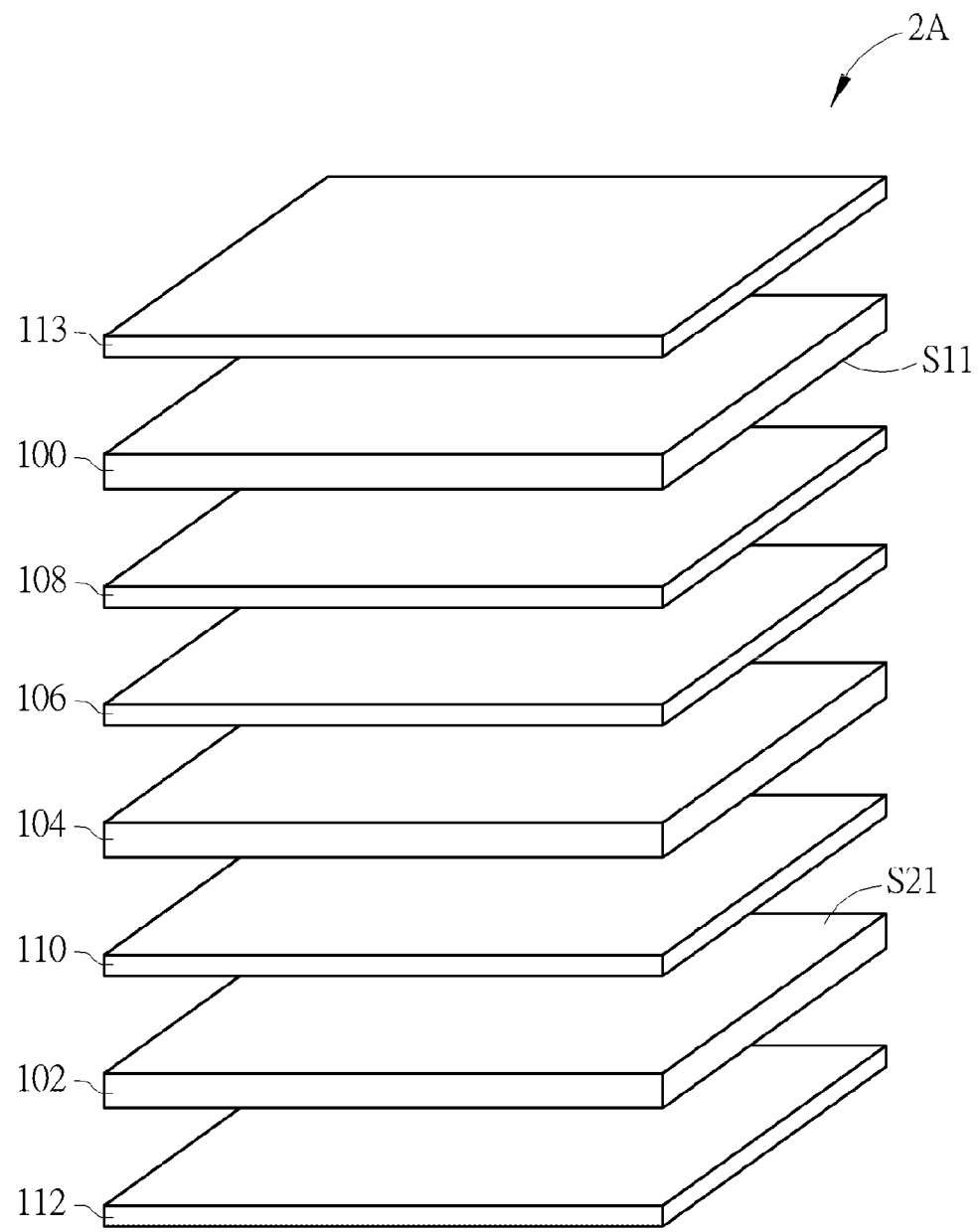
FIG. 10 is a schematic exploded view of a touch display panel with a force sensor according to a fifth embodiment of the present invention.
Figure 11:
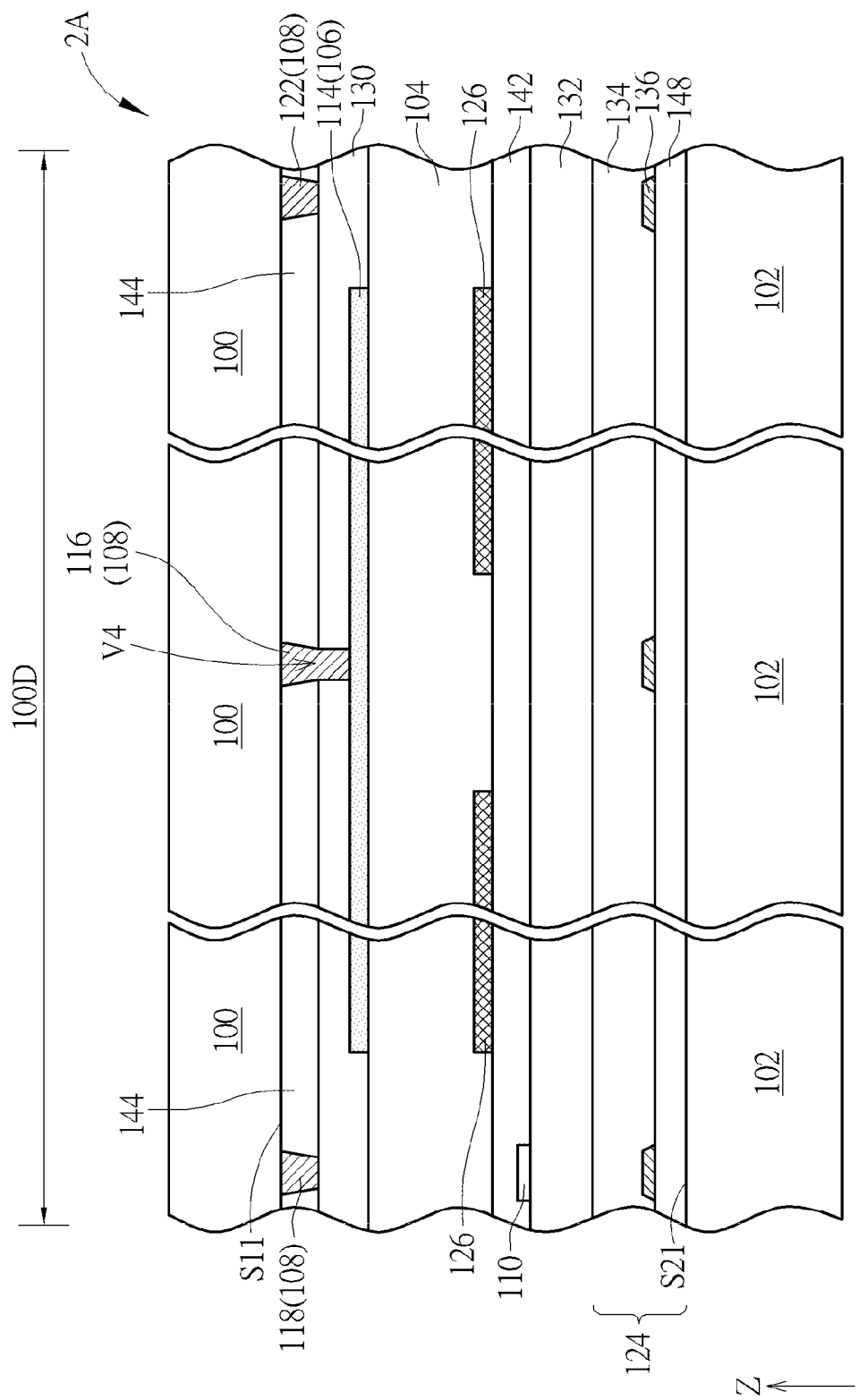
FIG. 11 is a schematic cross-sectional view of the fifth embodiment of the present invention.

Referring to FIG. 10 and FIG. 11, FIG. 10 is a schematic exploded view of a touch display panel with a force sensor according to a fifth embodiment of the present invention, which mainly shows film layers related to the force sensor and the touch sensing device, and FIG. 11 is a schematic cross-sectional view of the fifth embodiment of the present invention. In this embodiment, a common electrode and a pixel electrode of the touch display panel are disposed on surfaces of different substrates, that is, are respectively disposed at two sides of the display medium layer. As shown in FIG. 10 and FIG. 11, a touch display panel 2A of this embodiment differs from the first embodiment in that the switch layer 124 is disposed on the inner surface S21 of the second substrate 102, and the inner surface S21 is a surface, facing the display medium layer 104, of the second substrate 102. The pixel electrode layer 126 is disposed between the switch layer 124 and the display medium layer 104, and the display medium layer 104 is disposed between the pixel electrode layer 126 and the transparent electrode layer 106. In the display region 100D, the pixel electrode layer 126 and the transparent electrode layer 106 at least partially overlap in the direction Z vertical to the inner surface S11 of the first substrate 100. Besides, the second insulating layer 130 is disposed between the first conductive layer 108 and the transparent electrode layer 106, the second insulating layer 130 has a plurality of via holes V4, and the touch conductive lines 116 are electrically connected to the touch electrodes 114 of the transparent electrode layer 106 through the via holes V4 respectively. The ground electrode layer 110 is disposed on the inner surface S21 of the second substrate 102, the fourth insulating layer 142 is disposed between the pixel electrode layer 126 and the ground electrode layer 110, and the ground electrode layer 110 and the force sensing line 118 at least partially overlap in the direction Z vertical to the inner surface S11 of the first substrate 100. The ground electrode layer 110 may be selectively disposed at a plane the same as that of the pixel electrode layer 126, that is, the ground electrode layer 110 and the pixel electrode layer 126 may be integrated to form one layer, in this case, the fourth insulating layer 142 may be omitted, but the ground electrode layer 110 and the pixel electrode layer 126 need to be electrically insulated from each other. In another variant embodiment, the ground electrode layer 110 may be integrated in the switch layer 124, may be disposed between the switch layer 124 and the second substrate 102, or may be disposed outside the second substrate 102. In this embodiment, the touch display panel 2A further includes a color filter 114, which is disposed on the inner surface S11 of the first substrate 100. Besides, in this embodiment, the control unit 120 (not shown) is disposed on the inner surface S21 of the second substrate 102, and the first conductive layer 108 is located on the first substrate 100, and therefore, the force sensing lines 118 and the touch conductive lines 116 can be electrically connected to the control unit 120 through the via holes and other conductive lines (not shown) on the second substrate 102, but the present invention is not limited thereto. Other features of this embodiment may be approximately similar to those of the first embodiment, and details are not described herein again.

Besides, in this embodiment, in a frame display period of the touch display panel 2A, the transparent electrode layer 106 functions as a common electrode and receives a fixed voltage level, and the ground electrode layer 110 does not have a voltage level or is grounded. In a force sensing period, the force sensing lines 118 receive force sensing signals, and the ground electrode layer 110 is grounded. In a touch sensing period, the transparent electrode layer 106 functions as the touch electrodes 114, and the ground electrode layer 110 does not have a voltage level or is grounded.

Figure 12:
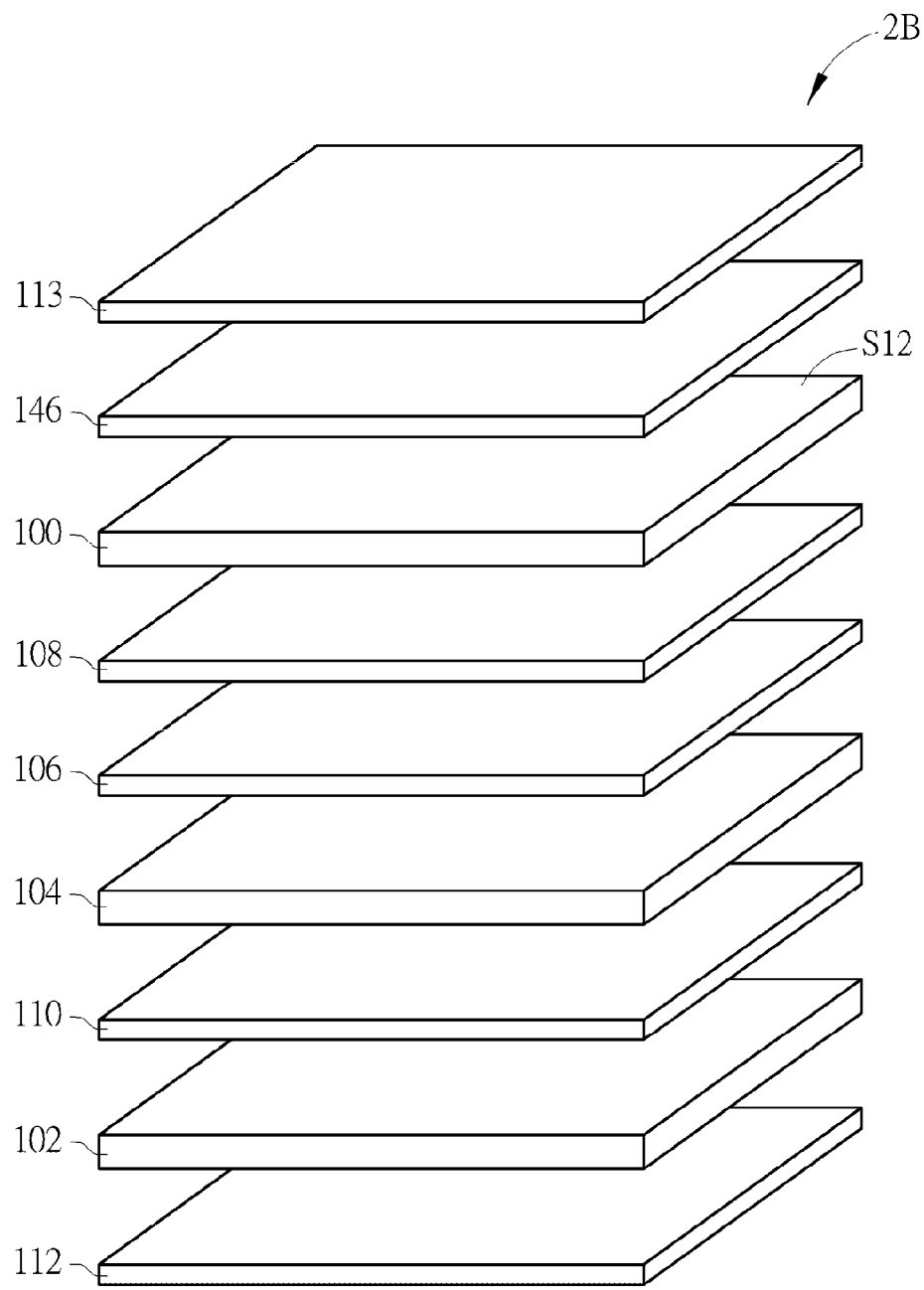
FIG. 12 is a schematic exploded view of a first variant embodiment of the fifth embodiment of the present invention.

Referring to FIG. 12, FIG. 12 is a schematic exploded view of a first variant embodiment of the fifth embodiment of the present invention, and FIG. 12 mainly shows film layers related to the force sensor and the touch sensing device. As shown in FIG. 12, this variant embodiment differs from the fifth embodiment in that the touch display panel 2B further includes a conductive shielding layer 146, which is disposed on the surface S12, opposite to the display medium layer 104, of the first substrate 100, and is disposed between the polarizer 113 and the first substrate 100. The conductive shielding layer 146 may include a metal or another appropriate conductive material. Other features of this embodiment may be approximately similar to those of the fifth embodiment, and details are not described herein again.

To sum up, the touch display panel with a force sensor of the present invention integrates a force sensor and a touch element into a display panel, where force sensing lines and touch conductive lines are formed by a same first conductive layer and therefore can be synchronously manufactured without an additional photo mask. This can be integrated into a conventional method for manufacturing a touch display panel, and can achieve effects of reducing film layer materials and reducing a thickness of the entire device. Besides, a polarizer is a common element in a common display panel, and when a ground electrode layer is integrated on a surface of the polarizer, the thickness of the entire device can also be reduced. Therefore, in this embodiment, the force sensor is integrated into the touch display panel, thereby improving a yield and the reliability of products as well as providing relatively small volume and weight.

The foregoing description merely describes preferred embodiments of the present invention, and any equivalent variations and modifications made to the claims of the present invention shall fall within the scope of the present invention.

What is claimed is:

1. A touch display panel with a force sensor, comprising:
a first substrate and a second substrate, the first substrate and the second substrate being oppositely disposed in parallel, the first substrate having a display region and a peripheral region, and the peripheral region surrounding the display region;
a display medium layer, disposed between the first substrate and the second substrate;
a transparent electrode layer, disposed on an inner surface of the first substrate, the transparent electrode layer comprising a plurality of touch electrodes disposed side by side in the display region, and the inner surface of the first substrate being a surface, facing the display medium layer, of the first substrate;
a first conductive layer, disposed on the inner surface of the first substrate and located at one side of the transparent electrode layer, the first conductive layer comprising:
a plurality of touch conductive lines, each being electrically connected to one of the touch electrodes; and
a plurality of force sensing lines, electrically insulated from the touch conductive lines;
a control unit, disposed at the peripheral region, and a portion of the force sensing lines extending from the display region to the peripheral region and being connected to the control unit;
a ground electrode layer, disposed on a surface of the second substrate;
a switch layer disposed on an inner surface of the second substrate, wherein the inner surface of the second substrate is a surface facing the display medium layer of the second substrate; and
a pixel electrode layer disposed between the switch layer and the display medium layer, wherein in the display region, the pixel electrode layer and the transparent electrode layer at least partially overlap in a direction vertical to the inner surface of the first substrate.

2. The touch display panel with a force sensor according to claim 1, wherein the touch electrodes are arranged as a plurality of straight columns along a first direction, the straight columns are disposed in parallel side by side along a second direction, and the first direction is not parallel with the second direction.

3. The touch display panel with a force sensor according to claim 2, wherein the force sensing lines approximately extend along the first direction in the display region.

4. The touch display panel with a force sensor according to claim 2, wherein the transparent electrode layer further comprises a plurality of strip-shaped force sensing electrodes extending along the first direction, and each of the force sensing electrodes is electrically connected to at least one of the force sensing lines.

5. The touch display panel with a force sensor according to claim 1, wherein the force sensing lines are divided into a plurality of sensing groups, the force sensing lines in each of the sensing groups are electrically connected to each other, and the force sensing lines in different sensing groups are not electrically connected to each other.

6. The touch display panel with a force sensor according to claim 5, wherein each of the sensing groups of the force sensing lines is electrically connected to the control unit respectively.

7. The touch display panel with a force sensor according to claim 5, wherein in a portion of the sensing groups, the force sensing lines in each sensing group are electrically connected to each other by means of a second conductive layer.

8. The touch display panel with a force sensor according to claim 1, wherein impedance of the ground electrode layer is $10^8$-$10^9 \Omega/\square$.

9. The touch display panel with a force sensor according to claim 1, further comprising: an insulating layer disposed between the first conductive layer and the transparent electrode layer, wherein the touch conductive lines are electrically connected to the touch electrodes through via holes in the insulating layer, respectively.

10. The touch display panel with a force sensor according to claim 1, wherein the ground electrode layer is disposed on the inner surface of the second substrate.

11. The touch display panel with a force sensor according to claim 1, further comprising: a conductive shielding layer disposed on a surface opposite to the display medium layer of the first substrate.

12. The touch display panel with a force sensor according to claim 1, wherein the force sensor is formed of the ground electrode layer, the force sensing lines, and the control unit.

* * * * *